United States Patent
Xu et al.

(10) Patent No.: US 9,920,156 B2
(45) Date of Patent: Mar. 20, 2018

(54) BLOCK COPOLYMER COMPRISING A BLOCK WITH GLASS TRANSITION TEMPERATURE HIGHER THAN 100° C. AND METHOD FOR PREPARING THE SAME

(71) Applicant: ZHEJIANG UNIVERSITY, Hangzhou (CN)

(72) Inventors: Shaohong Xu, Hangzhou (CN); Xiang Gao, Hangzhou (CN); Yingwu Luo, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 374 days.

(21) Appl. No.: 14/594,104

(22) Filed: Jan. 10, 2015

(65) Prior Publication Data

US 2015/0126667 A1     May 7, 2015

Related U.S. Application Data

(63) Continuation of application No. PCT/CN2013/077116, filed on Jun. 10, 2013.

(30) Foreign Application Priority Data

Jul. 13, 2012 (CN) .......................... 2012 1 0243061

(51) Int. Cl.
    C08F 293/00    (2006.01)
    C08F 2/24      (2006.01)
    C08F 2/10      (2006.01)

(52) U.S. Cl.
    CPC .............. C08F 293/00 (2013.01); C08F 2/10 (2013.01); C08F 2/24 (2013.01)

(58) Field of Classification Search
    CPC .................................. C08F 293/00; C08F 2/10
    See application file for complete search history.

(56) References Cited

U.S. PATENT DOCUMENTS

6,388,036 B1 * 5/2002 Gridnev ................. C08F 24/00
                                                          526/172
2010/0261832 A1   10/2010 Magnet et al. ............... 524/505

FOREIGN PATENT DOCUMENTS

CN      101016363 A     8/2007
CN      102304207 A     1/2012
              (Continued)

OTHER PUBLICATIONS

Pittman et al. Journal of Polymer Science: Part A: Polymer Chemistry, vol. 41, 1759-1777(2003).*
(Continued)

*Primary Examiner* — Ling Siu Choi
*Assistant Examiner* — Thuy-Ai N Nguyen
(74) *Attorney, Agent, or Firm* — J.C. Patents

(57) ABSTRACT

The present invention discloses a block copolymer comprising a block with glass transition temperature higher than 100° C. and a method for preparing the same. In the method, latex of a block copolymer is prepared by taking n-butyl acrylate as a soft block, random copolymer of styrene and γ-methyl-α-methylene-γ-butyrolactone as a hard block, utilizing emulsion polymerization system and reversible addition fragmentation chain transfer radical polymerization technology. The method utilizes an amphiphilic macromolecule reversible addition fragmentation chain transfer agent has dual function of both chain transfer agent and emulsifier, thus can achieve good control of monomer polymerization and avoid the use of traditional emulsifier; the reaction has no polymerization inhibition period, has fast reaction rate and high final conversion; colloidal particles can stably grow; product has a hard block with glass transition temperature up to 155° C., and thus has a good application prospect in the field of high heat resistance thermoplastic elastomer.

6 Claims, 2 Drawing Sheets

(56) References Cited

FOREIGN PATENT DOCUMENTS

| | | |
|---|---|---|
| CN | 102746478 A | 10/2012 |
| CN | 102746478 B | 7/2014 |
| EP | 1 463 765 A1 | 10/2004 |
| EP | 1 801 158 B1 | 1/2012 |
| WO | WO 2013/091565 A1 | 6/2013 |

OTHER PUBLICATIONS

International Search Report of corresponding International PCT Application No. PCT/CN2013/077116, dated Sep. 19, 2013.
Chinese First Examination Report of corresponding China Application No. 201210243061.1, dated Sep. 2, 2013.

\* cited by examiner

BLOCK COPOLYMER COMPRISING A BLOCK WITH GLASS TRANSITION TEMPERATURE HIGHER THAN 100° C. AND METHOD FOR PREPARING THE SAME

CROSS-REFERENCE TO RELATED APPLICATIONS

This application is a continuation of International Application No. PCT/CN2013/077116, filed on Jun. 10, 2013, which claims the priority benefit of China Patent Application No. 201210243061.1, filed on Jul. 13, 2012. The contents of the above identified applications are incorporated herein by reference in their entireties.

FIELD OF THE TECHNOLOGY

The present invention relates to a block copolymer, and in particular to a method for preparing latex of a block copolymer containing blocks with glass transition temperature higher than 100° C.

BACKGROUND

A thermoplastic elastomer is a class of polymeric material that has characteristics of rubber elastomer at room temperature and can be conveniently processed as plastic at high temperature. There is a rapid grown market demand for the polymeric material, especially, what has the greatest demand is styrene-based block copolymer. It was reported that market demand for styrene-based block copolymer in 2013 was expected to reach 2 million tons/year, nearly half of the global market demand for thermoplastic elastomer. However, the heat-resistant temperature of the styrene-based block copolymer is limited to glass transition temperature (100° C.) of segments of polystyrene, and when the temperature of the styrene-based block copolymer is close to 100° C., mechanical properties of the block copolymer will decreased sharply. Therefore the key to broadening the application field of the block copolymer is to increase the glass transition temperature (Tg) of hard blocks of the block copolymer, which is achieved according to the present invention by introducing γ-methyl-α-methylene-γ-butyrolactone, MeMBL monomer to copolymerize with styrene. MeMBL is a new monomer prepared by biomass feedstock, and the homopolymer of the monomer has a glass transition temperature of up to 210-227° C. If MeMBL is used to copolymerize with styrene, the glass transition temperature of hard blocks of polystyrene can be increased and thereby styrene-based block copolymer containing hard blocks with a higher glass transition temperature (Tg) can be synthesized, the styrene-based block copolymer is hopeful to be used as a thermoplastic elastomer with high heat resistance, and has a great market prospect in electrical wire coating, hot air duct, automotive engine gasket and sealing ring and other fields.

Conventional methods for synthesizing a styrene-based block copolymer mainly include anionic polymerization and cationic polymerization. However, on one hand, the both methods have a high requirement for purities of raw materials and reactions in the both methods need to be conducted under a high vacuum condition and generally at a low temperature; on the other hand, few studies are conducted on ionic copolymerization, and in a practical application, the ionic copolymerization is limited to modification by adding a small amount of a second monomer. There is still a great challenge in directly preparing the block copolymer from ethylene-based monomers through anionic polymerization or cationic polymerization. Therefore, compared with a radical polymerization, anionic polymerization and cationic polymerization have huge disadvantages in terms of energy saving and environmental protection or the polymerization conditions.

Controlled/living radical polymerization (CLRP) technology developed in the 1990s has become a focus of academic research and attracted much attention in industries. Wherein reversible addition fragmentation chain transfer radical polymerization (RAFT) that characterized of wide application range of monomers and mild reaction condition is hailed as the most promising living radical polymerization technique in industries. The RAFT technology may effectively control polymerization of monomers by reversible transfer of propagating radicals, achieving controllable adjustment of microstructure and degree of polymerization of a polymer (such as block copolymer). The technology may be applied to homopolymerization and copolymerization system of multiple monomers and is suitable for almost all ethylene-based monomers, and reaction conditions employed in the technology are the same as the conventional radical polymerization. The technology may be suitable for bulk polymerization, solution polymerization, emulsion polymerization, suspension polymerization and other polymerization systems. Wherein free radical polymerization in industries often utilizes emulsion polymerization system, because emulsion polymerization system has many advantages, such as using water as a medium, convenient heat transfer, environment-friendly and safe, low latex viscosity, convenient pipeline transportation and continuous production; molecular chain growth in the emulsion polymerization system is achieved in an isolated phase of micelles or colloidal particles, and thus free radicals have a long life, reaction rate is high and degree of polymerization is high; latex obtained in reaction can be directly used, for example, as an aqueous latex, binders, paper, leather, fabric treatment agent. An amphiphilic macromolecular reversible addition fragmentation chain transfer agent is obtained by polymerizing a small molecule reversible addition fragmentation chain transfer agent sequentially with a hydrophilic monomer and a lipophilic monomer. The macromolecular reversible addition fragmentation chain transfer agent can act as both a chain transfer agent and an emulsifying agent due to its amphipathy, and can avoid the use of traditional emulsifiers when applied to an emulsion polymerization system, thereby preventing generation of foam during production and reducing costs. Therefore, if the RAFT technology and an emulsion system can be combined, it is expected to provide a polymerization route that characterized of green, environment-friendly, product controllable, and good prospects in the industrial application for high heat-resistant styrene-based block copolymer.

However, there exist many problems in RAFT emulsion polymerization system, such as colloid instability, slow polymerization and polymerization inhibition, wide molecular weight distribution, significant deviation between actual molecular weight and theoretical molecular weight. Gilbert et al. use polyacrylic acid-polybutyl acrylate amphiphilic macromolecule as a reversible addition fragmentation chain transfer agent to conduct RAFT semi-continuous emulsion polymerization of styrene fed with starvation method, and thereby solving the problem of emulsion instability. However, this process is complex, and the obtained molecular weight has a great deviation from the predetermined molecular weight, that is, the target block copolymer was not obtained. Charleux et al. conducted a batch emulsion polymerization of styrene by using polyethylene oxide-containing macromolecule as the reversible addition fragmentation chain transfer agent, with final conversion of only 66.7% after 22.7 hours. Other literatures reported many other amphiphilic macromolecule reversible addition fragmentation chain transfer agents that were utilized in batch emulsion polymerization of styrene, such as polystyrene-polyvinylphenyltriethyl ammonium chloride as a two-blocks reversible addition fragmentation chain transfer agent, polydiethylaminoethyl methacrylate as a mono-block reversible addition fragmentation chain transfer agent, polyethylene oxide-polydiethylaminoethyl methacrylate as a two-block reversible addition fragmentation chain transfer agent, but they have failed to show any molecular weight controllability. According to reports in literature, the main reason for the failure of styrene RAFT emulsion polymerization lies in the fact that the amphiphilic macromolecule reversible addition fragmentation chain transfer agent used has a poorly designed length ratio of lipophilic segment to hydrophilic segments and can only be dissolved in water by addition of an alkali for neutralization. As a result, this reaction has a long period of polymerization inhibition, slow reaction rate and low final conversion, and thus the obtained product has an uncontrolled molecular weight, a broad molecular weight distribution, and thereby emulsion system is instable. Therefore high molecular weight polymer and block copolymer cannot be synthesized well. Luo yingwu et al. designed and synthesized an amphiphilic macromolecule reversible addition fragmentation chain transfer agent, polyacrylic acid-polystyrene with a longer hydrophilic segment, which can be dissolved in water without neutralization. Carboxyl is ionized from the hydrophilic segment of polyacrylic acid-polystyrene by adding alkali during the emulsion polymerization, which can achieve electrostatic stabilization and thus improve stability of latex particles. Moreover, the emulsion polymerization has a high reaction rate and a high final conversion. The obtained product has a molecular weight which is consistent with theoretically designed molecular weight thereof, and has a narrow molecular weight distribution. Consequently, poly(styrene-b-butyl acrylate-b-styrene), a three-block copolymer, was successfully prepared. However, styrene block therein has a glass transition temperature of only about 100° C., which would greatly limit application of such material in high temperature fields.

SUMMARY

In view of the existing problems in the prior art above, an object of the present invention is to provide a block copolymer comprising a block with glass transition temperature higher than 100° C., and a method for preparing the same.

The object of the present invention is achieved by the following technical solution:

A block copolymer comprising a block with glass transition temperature higher than 100° C., which is represented by the following structural formula: $AA_{n1}$-b-$St_{n2}$-b-$(MeMBL\text{-}co\text{-}St)_{n3}$-b-$nBA_{n4}$-b-$(MeMBL\text{-}co\text{-}St)_{n5}$-R;
wherein, in $AA_{n1}$, AA is methacrylic acid monomer unit or acrylic acid monomer unit, $n_1$ is an average degree of polymerization of AA, $n_1$=20-60; in $St_{n2}$, St is styrene monomer unit, $n_2$ is an average degree of polymerization of St, $n_2$=3-10; in $(MeMBL\text{-}co\text{-}St)_{n3}$, MeMBL-co-St is random copolymer of MeMBL and St, MeMBL is γ-methyl-α-methylene-γ-butyrolactone monomer unit, St is styrene monomer unit, the ratio of the numbers of MeMBL unit to St unit is 1:4 to 1:1, $n_3$ is an average degree of polymerization of MeMBL-co-St copolymer, $n_3$=130-500; in $nBA_{n4}$, nBA is n-butyl acrylate monomer unit, $n_4$ is an average degree of polymerization of nBA, $n_4$=200-1600; in $(MeMBL\text{-}co\text{-}St)_{n5}$, MeMBL-co-St is random copolymer of MeMBL and St, MeMBL is γ-methyl-α-methylene-γ-butyrolactone monomer unit, St is styrene monomer unit, the ratio of the numbers of MeMBL unit to St unit is 1:4 to 1:1, $n_5$ is an average degree of polymerization of MeMBL-co-St copolymer, $n_5$=130-500; R is an alkyl dithio ester group or an alkyl trithio ester group. The block copolymer of the present invention is stably dispersed in water in the form of particles and has a volume average particle diameter of 80-140 nm.

A method for preparing latex of a block copolymer comprising a block with glass transition temperature higher than 100° C. by a reversible addition fragmentation chain transfer emulsion polymerization, comprising the following steps:

First step: dissolving 0.6-2.4 parts by weight of an amphiphilic macromolecule reversible addition fragmentation chain transfer agent into 30-90 parts by weight of water under stirring, to form a homogeneous aqueous phase, and then pouring the aqueous phase together with a oil phase composed of 3.4-11 parts by weight of St and 1.8-9 parts by weight of MeMBL into a reactor and mixing them under stirring, raising the reactor temperature to 50-80° C., and then introducing nitrogen thereinto for 30-60 minutes while keeping stirring, and then adding 0.01-0.04 parts by weight of a water-soluble initiator thereinto to initiate polymerization, adding an aqueous solution containing 0.07-0.27 parts by weight of an alkali when the polymerization is conducted for 10-25 minutes, to continue reacting for 15-40 minutes to obtain $AA_{n1}$-b-$St_{n2}$-b-$(MeMBL\text{-}co\text{-}St)_{n3}$-R polymer.

Second step: after completion of the first step, adding 7-25 parts by weight of water and adding dropwise 14-36 parts by weight of a nBA monomer at a rate of 0.4 to 1.4 parts by weight/minute to continue reacting and supplying 0-30 parts by weight of water for dilution during the reaction, to obtain $AA_{n1}$-b-$St_{n2}$-b-$(MeMBL\text{-}co\text{-}St)_{n3}$-b-$nBA_{n4}$-R block copolymer, wherein the time for adding dropwise and reacting is 60-120 minutes in total.

Third step: after completion of the second step, supplementing 0-10 parts by weight of water, and adding dropwise a monomer mixture of 3.4-12 parts by weight of St and 1.9-9.5 parts by weight of MeMBL at a rate of 0.1 to 0.6 parts by weight/minute to continue reacting and obtain $AA_{n1}$-b-$St_{n2}$-b-$(MeMBL\text{-}co\text{-}St)_{n3}$-b-$nBA_{n4}$-b-$(MeMBL\text{-}co\text{-}St)_{n5}$-R block copolymer latex, wherein the time for adding dropwise and reacting is 90-140 minutes in total.

The present invention has the following beneficial effects. Specifically, the present invention uses an emulsion system combined with a reversible addition fragmentation chain transfer living radical polymerization technique to prepare latex of a block copolymer containing a block with a glass transition temperature of greater than 100° C., and having controlled molecular weight and high colloidal stability. The present invention is characterized in that:

1. Water is used as a dispersion medium which is conducive to heat transfer and environmental safety, and the obtained latex has a low viscosity that is conducive to pipeline transportation and continuous production;

2. The amphiphilic macromolecule reversible addition fragmentation chain transfer agent utilized in the method has dual function of both chain transfer agent and emulsifier, and thus can achieve a good control of the monomer polymerization and also avoid the use of traditional emulsifier;

3. The reaction has no polymerization inhibition period and has fast reaction rate, conversion of monomer for each block is high, which are helpful to improve production efficiency;

4. Addition of the alkali in the middle of the first step can improve emulsion stability, and achieve stable colloidal particle growth and constant number of particles, and meanwhile secondary nucleation phenomenon does not exist and particle size distribution is narrow;

5. The resulting copolymer has a hard block with glass transition temperature higher than 100° C. (Tg of the hard block can be regulated by composition of the copolymer, up to 155° C.), and thus has a good application prospect in the field of high heat resistance thermoplastic elastomer;

6. The latex obtained in the reaction can be directly used as aqueous latex, binder, paper, leather, fabric treatment agents and so on.

DETAILED DESCRIPTION

Figure 1:
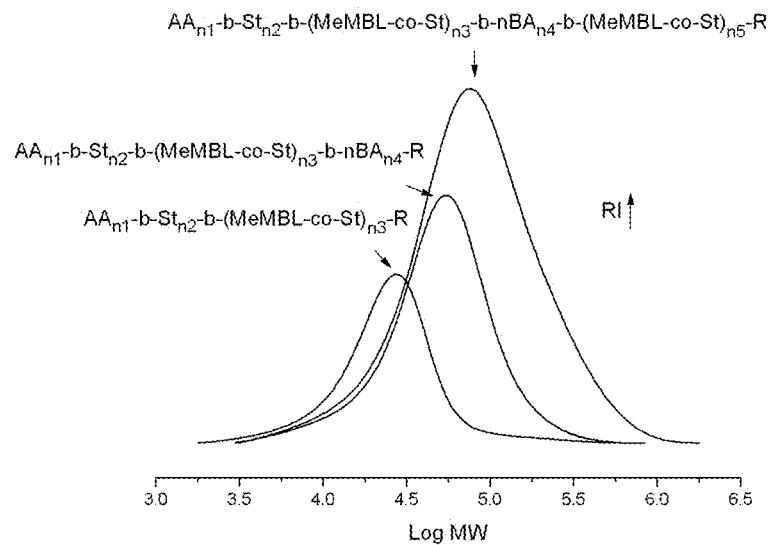
FIG. 1 is a GPC curve of the polymer obtained by three steps in Embodiment 1 of the present invention.

The method for preparing latex of a block copolymer comprising a block with glass transition temperature higher than 100° C. by reversible addition fragmentation chain transfer emulsion polymerization according to the present invention comprises the following steps:

First step: dissolving 0.6-2.4 parts by weight of an amphiphilic macromolecule reversible addition fragmentation chain transfer agent into 30-90 parts by weight of water under stirring, to form a homogeneous aqueous phase, and then pouring the aqueous phase together with a oil phase composed of 3.4-11 parts by weight of St and 1.8-9 parts by weight of MeMBL into a reactor and mixing them under stirring, raising the reactor temperature to 50-80° C., and then introducing nitrogen thereinto for 30-60 minutes while keeping stirring, and then adding 0.01-0.04 parts by weight of a water-soluble initiator thereinto to initiate polymerization, adding an aqueous solution containing 0.07-0.27 parts by weight of an alkali when the polymerization is conducted for 10-25 minutes, to continue reacting for 15-40 minutes to obtain $AA_{n1}$-b-$St_{n2}$-b-(MeMBL-co-St)$_{n3}$-R polymer.

Second step: after completion of the first step, adding 7-25 parts by weight of water and adding dropwise 14-36 parts by weight of a nBA monomer at a rate of 0.4 to 1.4 parts by weight/minute to continue reacting and supplying 0-30 parts by weight of water for dilution during the reaction, to obtain $AA_{n1}$-b-$St_{n2}$-b-(MeMBL-co-St)$_{n3}$-b-$nBA_{n4}$-R block copolymer, wherein the time for adding dropwise and reacting is 60-120 minutes in total.

Third step: after completion of the second step, supplementing 0-10 parts by weight of water, and adding dropwise a monomer mixture of 3.4-12 parts by weight of St and 1.9-9.5 parts by weight of MeMBL at a rate of 0.1 to 0.6 parts by weight/minute to continue reacting and obtain $AA_{n1}$-b-$St_{n2}$-b-(MeMBL-co-St)$_{n3}$-b-$nBA_{n4}$-b-(MeMBL-co-St)$_{n5}$-R block copolymer latex, wherein the time for adding dropwise and reacting is 90-140 minutes in total.

In step 1, the amphiphilic macromolecule reversible addition fragmentation chain transfer agent has a chemical structure represented by the following general formula:

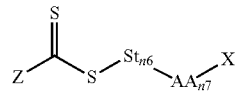

wherein, St is styrene monomer unit, AA is methacrylic acid monomer unit or acrylic acid monomer unit, Z is alkylthio or alkyl having four to twelve carbon atoms, phenyl or benzyl, X is iso-propionyloxy, acetoxy, 2-cyanoacetoxy or 2-aminoacetoxy; $n_6$ is an average degree of polymerization of styrene monomer unit, $n_6$=3-10, $n_7$ is an average degree of polymerization of a methacrylic acid monomer unit or an acrylic acid monomer unit, and $n_7$=20-60.

The water-soluble initiator may be potassium persulfate, ammonium persulfate, hydrogen peroxide or a derivative of hydrogen peroxide. The alkali may be sodium hydroxide, potassium hydroxide, sodium carbonate, potassium carbonate, sodium bicarbonate or potassium bicarbonate.

Conversion of monomers in each step is measured by gravimetric method.

Particle diameter and particle size distribution of latex particles in each step is determined by Malvern ZETA-SIZER 3000 HAS particle diameter analyzer, and the number of latex particles can be calculated by the following formula:

$$N_p = \frac{6m}{\pi d_p D_v^3}$$

Where, $N_p$ is the number of latex particles, m is polymer mass ($g_{Latex}^{-1}$), $d_p$ is polymer density, and $D_v$ is volume average particle diameter. Particle size distribution coefficient is the ratio of the volume average particle diameter to number average particle diameter.

Designed molecular weight is calculated by the following formula:

$$M_{n,th} = \frac{m \cdot x}{[RAFT]} + M_{n,RAFT}$$

Where, $M_{n,th}$ is designed value of molecular weight of polymer in emulsion at the end of reaction in each step, m is total mass of monomers added in this reaction step, x is conversion, [RAFT] is the mole number of the amphiphilic reversible addition fragmentation chain transfer agent added before reaction, and $M_{n,RAFT}$ is molecular weight of the amphiphilic reversible addition fragmentation chain transfer agent.

The molecular weight of the polymer is characterized on gel permeation chromatographic instrument Waters1525-2414-717GPC, using tetrahydrofuran as eluent and calibrating with polystyrene standard with narrow molecular weight distribution.

Characteristic functional group of the block copolymer is characterized by infrared spectrograph Nicolet 5700.

Morphology of the polymer latex particles is characterized using transmission electron microscope JOEL JEMACRO-123, with testing voltage being 80 kV.

Tg of the block copolymer is determined on TA Q200 instrument under nitrogen atmosphere, with the temperature being raised from −80° C. to 200° C. at a rate of 10° C./min.

Experiments have shown that the block copolymer prepared according to the present invention has a hard block with glass transition temperature higher than 100° C. and up to 155° C., and has a good application prospect in the field of high heat resistance thermoplastic elastomer; it can be used directly as water emulsion, binder, paper, leather, fabric treatment agents and the like.

The present invention will be described in detail with reference to drawings and embodiments, the object and effects of the present invention will become more apparent therefrom.

The amphiphilic macromolecule reversible addition fragmentation chain transfer agent utilized in embodiments of the present invention has a chemical structure represented by the following formula:

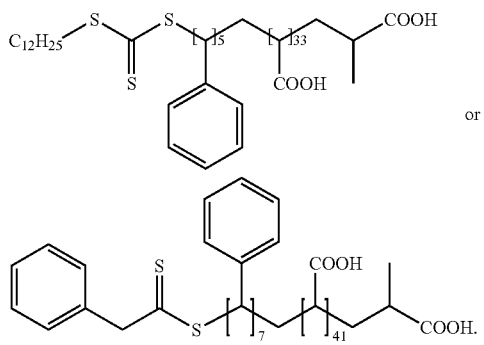

Embodiment 1

$(MeMBL-Co-St)_{n3}$-b-$nBA_{n4}$-b-$(MeMBL-Co-St)_{n5}$
Three-Block with Designed Molecular Weight of 30K-25K-30K, Wherein the Ratio of the Numbers of MeMBL Unit to St Units is 1:2

First step: dissolving 1.9 parts by weight of amphiphilic macromolecule reversible addition fragmentation chain transfer agent (1) into 85 parts by weight of water under stirring, to form a homogeneous aqueous phase, and then pouring the aqueous phase together with a oil phase composed of 11 parts by weight of St and 6 parts by weight of MeMBL into a reactor and mixing them under stirring, raising the reactor temperature to 70° C., and then introducing nitrogen thereinto for 30 minutes while keeping stirring, and then adding 0.03 parts by weight of potassium persulfate thereinto to initiate polymerization, adding an aqueous solution containing 0.2 parts by weight of sodium hydroxide when the polymerization is conducted for 20 minutes, to continue reacting for 20 minutes to obtain $AA_{n1}$-b-$St_{n2}$-b-$(MeMBL$-co-$St)_{n3}$-R polymer.

Second step: after completion of the first step, adding 10 parts by weight of water and adding dropwise 15 parts by weight of a nBA monomer at a rate of 1 part by weight/minute, to react for 66 minutes (including the time for adding nBA monomer dropwise), to obtain $AA_{n1}$-b-$St_{n2}$-b-$(MeMBL$-co-$St)_{n3}$-b-$nBA_{n4}$-R block copolymer.

Third step: after completion of the second step, adding dropwise a monomer mixture of 12 parts by weight of St and 6.5 parts by weight of MeMBL at a rate of 0.3 parts by weight/minute to react for 116 minutes (including the time for adding the monomer mixture dropwise), to obtain $AA_{n1}$-b-$St_{n2}$-b-$(MeMBL$-co-$St)_{n3}$-b-$nBA_{n4}$-b-$(MeMBL$-co-$St)_{n5}$-R block copolymer latex.

Figure 2:
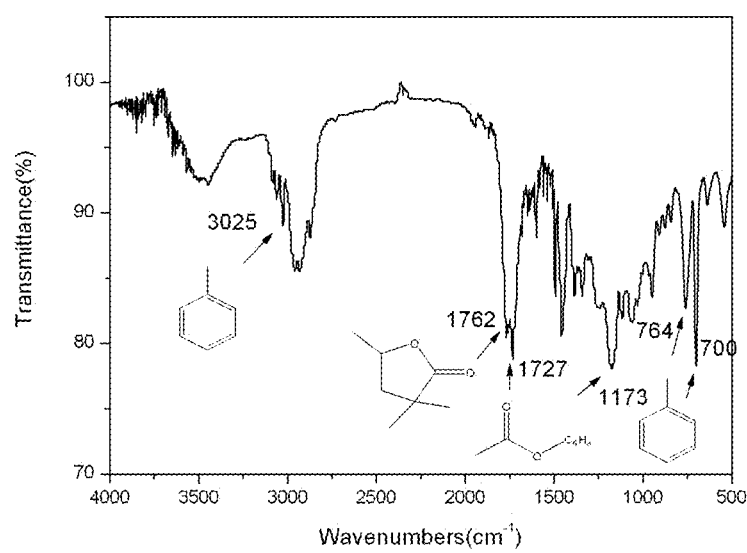
FIG. 2 is an infra-red spectrogram of the block copolymer obtained in Embodiment 1 of the present invention.
Figure 3:
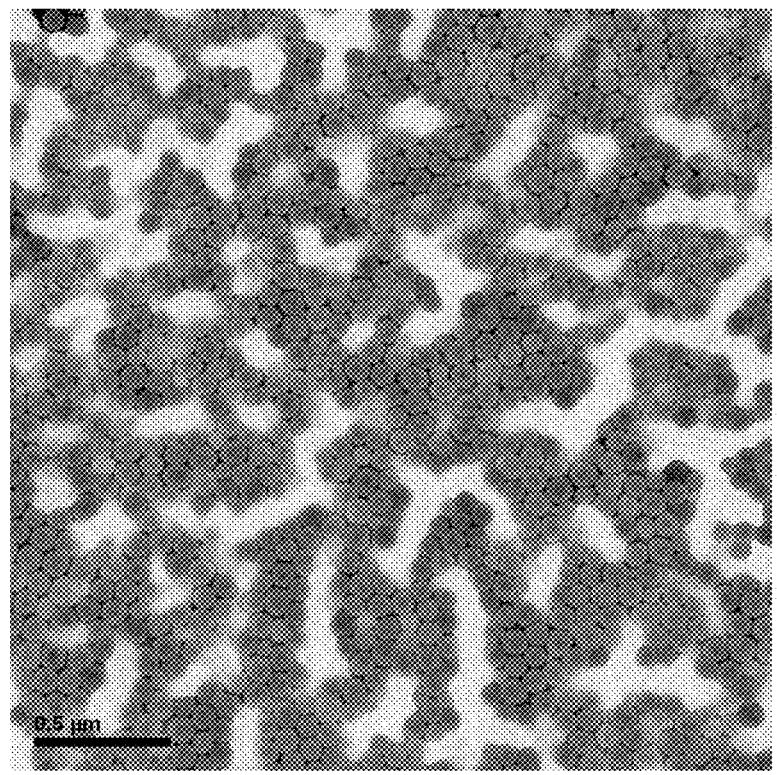
FIG. 3 is a transmission electron microscope spectrogram of latex of the block copolymer obtained in Embodiment 1 of the present invention.
Figure 4:
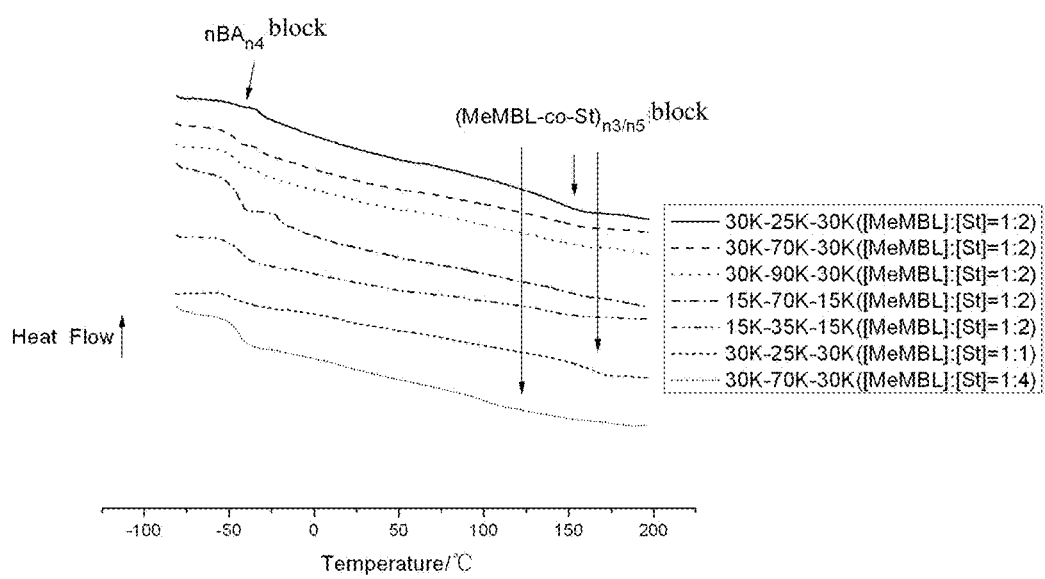
FIG. 4 is a DSC curve of the block copolymers obtained in Embodiments 1-7 of the present invention.

As shown in Table 1, each step in Embodiment 1 has short reaction time and a high conversion. As the reaction proceeds, the particle diameter of the latex particles is increasing while maintaining a constant number of particles and very narrow particle size distribution. It is proved that the system is stable and has no secondary nucleation phenomenon. It can be seen from data of Embodiment 1 in Table 2 that measured value of molecular weight of polymer obtained in each step is consistent with designed value thereof, the molecular weight of the copolymer is gradually increased and the final molecular weight distribution of the copolymer is relatively narrow, indicating the method has well controlled the polymerization of monomers. As shown in FIG. 1, molecular weight of each block exhibits a single peak and is gradually increased, which proves that block copolymer is prepared. It can be seen from FIG. 2 that characteristic functional groups of each block of the copolymer have a clear peak, proving that product prepared is a designed product. It can be seen from FIG. 3 that what is finally prepared in the reaction is latex particles having uniform particle diameter and good morphology. In FIG. 4, in DSC curve of 30K-25K-30K ([MeMBL]:[St]=1:2), there is a clear glass transition endothermic peak in the vicinity of −55° C. and 135° C., which also proves that product has designed structure and shows a high glass transition temperature of the hard block.

Embodiment 2

$(MeMBL-Co-St)_{n3}$-b-$nBA_{n4}$-b-$(MeMBL-Co-St)_{n5}$
Three-Block with Designed Molecular Weight of 30K-70K-30K, Wherein the Ratio of the Numbers of MeMBL Unit to St Units is 1:2

First step: dissolving 1.3 parts by weight of amphiphilic macromolecule reversible addition fragmentation chain transfer agent (1) into 62 parts by weight of water under stirring, to form a homogeneous aqueous phase, and then pouring the aqueous phase together with a oil phase composed of 7.5 parts by weight of St and 4 parts by weight of MeMBL into a reactor and mixing them under stirring, raising the reactor temperature to 70° C., and then introducing nitrogen thereinto for 40 minutes while keeping stirring, and then adding 0.02 parts by weight of potassium persulfate thereinto to initiate polymerization, adding an aqueous solution containing 0.17 parts by weight of sodium hydroxide when the polymerization is conducted for 20 minutes, to continue reacting for 20 minutes to obtain $AA_{n1}$-b-$St_{n2}$-b-$(MeMBL$-co-$St)_{n3}$-R polymer.

Second step: after completion of the first step, adding 7 parts by weight of water and adding dropwise 15 parts by weight of a nBA monomer at a rate of 1.4 parts by weight/minute and supplying 14 parts by weight of water for dilution during the reaction, to react for 73 minutes (including the time for adding nBA monomer dropwise), to obtain $AA_{n1}$-b-$St_{n2}$-b-$(MeMBL$-co-$St)_{n3}$-b-$nBA_{n4}$-R block copolymer.

Third step: after completion of the second step, supplying 10 parts by weight of water, and adding dropwise a monomer mixture of 7.5 parts by weight of St and 4.2 parts by weight of MeMBL at a rate of 0.4 parts by weight/minute to react for 93 minutes (including the time for adding the monomer mixture dropwise), to obtain $AA_{n1}$-b-$St_{n2}$-b-(MeMBL-co-St)$_{n3}$-b-nBA$_{n4}$-b-(MeMBL-co-St)$_{n5}$-R block copolymer latex.

Reaction time, conversion, particle diameter of latex, number of particles and particle size distribution in each step are shown in Table 1. Designed molecular weight, measured molecular weight and molecular weight distribution of polymers prepared in each step are shown in Table 2. DSC curves thereof are shown in FIG. 4.

Embodiment 3

(MeMBL-Co-St)$_{n3}$-b-nBA$_{n4}$-b-(MeMBL-Co-St)$_{n5}$
Three-Block with Designed Molecular Weight of
30K-90K-30K, Wherein the Ratio of the Numbers
of MeMBL Unit to St Unit is 1:2

First step: dissolving 1.3 parts by weight of amphiphilic macromolecule reversible addition fragmentation chain transfer agent (1) into 62 parts by weight of water under stirring, to form a homogeneous aqueous phase, and then pouring the aqueous phase together with a oil phase composed of 7.5 parts by weight of St and 4 parts by weight of MeMBL into a reactor and mixing them under stirring, raising the reactor temperature to 70° C., and then introducing nitrogen thereinto for 30 minutes while keeping stirring, and then adding 0.02 parts by weight of potassium persulfate thereinto to initiate polymerization, adding an aqueous solution containing 0.16 parts by weight of sodium hydroxide when the polymerization is conducted for 20 minutes, to continue reacting for 20 minutes to obtain $AA_{n1}$-b-$St_{n2}$-b-(MeMBL-co-St)$_{n3}$-R polymer.

Second step: after completion of the first step, adding 10 parts by weight of water and adding dropwise 20 parts by weight of a nBA monomer at a rate of 1 part by weight/minute and supplying 30 parts by weight of water for dilution during the reaction, to react for 94 minutes (including the time for adding nBA monomer dropwise), to obtain $AA_{n1}$-b-$St_{n2}$-b-(MeMBL-co-St)$_{n3}$-b-nBA$_{n4}$-R block copolymer.

Third step: after completion of the second step, supplying 10 parts by weight of water, and adding dropwise a monomer mixture of 7.5 parts by weight of St and 4 parts by weight of MeMBL at a rate of 0.4 parts by weight/minute to react for 138 minutes (including the time for adding the monomer mixture dropwise), to obtain $AA_{n1}$-b-$St_{n2}$-b-(MeMBL-co-St)$_{n3}$-b-nBA$_{n4}$-b-(MeMBL-co-St)$_{n5}$-R block copolymer latex.

Reaction time, conversion, particle diameter of latex, number of particles and particle size distribution in each step are shown in Table 1. Designed molecular weight, measured molecular weight and molecular weight distribution of polymers prepared in each step are shown in Table 2. DSC curves thereof are shown in FIG. 4.

Embodiment 4

(MeMBL-Co-St)$_{n3}$-b-nBA$_{n4}$-b-(MeMBL-Co-St)$_{n5}$
Three-Block with Designed Molecular Weight of
15K-70K-15K, Wherein the Ratio of the Numbers
of MeMBL Unit to St Unit is 1:2

First step: dissolving 1.6 parts by weight of amphiphilic macromolecule reversible addition fragmentation chain transfer agent (1) into 38 parts by weight of water under stirring, to form a homogeneous aqueous phase, and then pouring the aqueous phase together with a oil phase composed of 4.7 parts by weight of St and 2.7 parts by weight of MeMBL into a reactor and mixing them under stirring, raising the reactor temperature to 70° C., and then introducing nitrogen thereinto for 60 minutes while keeping stirring, and then adding 0.03 parts by weight of potassium persulfate thereinto to initiate polymerization, adding an aqueous solution containing 0.17 parts by weight of sodium hydroxide when the polymerization is conducted for 20 minutes, to continue reacting for 20 minutes to obtain $AA_{n1}$-b-$St_{n2}$-b-(MeMBL-co-St)$_{n3}$-R polymer.

Second step: after completion of the first step, adding 20 parts by weight of water and adding dropwise 35 parts by weight of a nBA monomer at a rate of 1 part by weight/minute and supplying 30 parts by weight of water for dilution during the reaction, to react for 75 minutes (including the time for adding nBA monomer dropwise), to obtain $AA_{n1}$-b-$St_{n2}$-b-(MeMBL-co-St)$_{n3}$-b-nBA$_{n4}$-R block copolymer.

Third step: after completion of the second step, supplying 9 parts by weight of water, and adding dropwise a monomer mixture of 4.9 parts by weight of St and 2.7 parts by weight of MeMBL at a rate of 0.4 parts by weight/minute to react for 95 minutes (including the time for adding the monomer mixture dropwise), to obtain $AA_{n1}$-b-$St_{n2}$-b-(MeMBL-co-St)$_{n3}$-b-nBA$_{n4}$-b-(MeMBL-co-St)$_{n5}$-R block copolymer latex.

Reaction time, conversion, particle diameter of latex, number of particles and particle size distribution in each step are shown in Table 1. Designed molecular weight, measured molecular weight and molecular weight distribution of polymers prepared in each step are shown in Table 2. DSC curves thereof are shown in FIG. 4.

Embodiment 5

(MeMBL-Co-St)$_{n3}$-b-nBA$_{n4}$-b-(MeMBL-Co-St)$_{n5}$
Three-Block with Designed Molecular Weight of
15K-35K-15K, Wherein the Ratio of the Numbers
of MeMBL Unit to St Unit is 1:2

First step: dissolving 2.4 parts by weight of amphiphilic macromolecule reversible addition fragmentation chain transfer agent (1) into 57 parts by weight of water under stirring, to form a homogeneous aqueous phase, and then pouring the aqueous phase together with a oil phase composed of 7 parts by weight of St and 3.8 parts by weight of MeMBL into a reactor and mixing them under stirring, raising the reactor temperature to 70° C., and then introducing nitrogen thereinto for 30 minutes while keeping stirring, and then adding 0.04 parts by weight of potassium persulfate thereinto to initiate polymerization, adding an aqueous solution containing 0.27 parts by weight of sodium hydroxide when the polymerization is conducted for 20 minutes, to continue reacting for 20 minutes to obtain $AA_{n1}$-b-$St_{n2}$-b-(MeMBL-co-St)$_{n3}$-R polymer.

Second step: after completion of the first step, adding 10 parts by weight of water and adding dropwise 26 parts by weight of a nBA monomer at a rate of 1 part by weight/minute and supplying 15 parts by weight of water for dilution during the reaction, to react for 64 minutes (including the time for adding nBA monomer dropwise), to obtain $AA_{n1}$-b-$St_{n2}$-b-(MeMBL-co-St)$_{n3}$-b-nBA$_{n4}$-R block copolymer.

Third step: after completion of the second step, supplying 8 parts by weight of water, and adding dropwise a monomer mixture of 7.4 parts by weight of St and 4 parts by weight of MeMBL at a rate of 0.3 parts by weight/minute to react for 97 minutes (including the time for adding the monomer mixture dropwise), to obtain $AA_{n1}$-b-$St_{n2}$-b-(MeMBL-co-St)$_{n3}$-b-n$BA_{n4}$-b-(MeMBL-co-St)$_{n5}$-R block copolymer latex.

Reaction time, conversion, particle diameter of latex, number of particles and particle size distribution in each step are shown in Table 1. Designed molecular weight, measured molecular weight and molecular weight distribution of polymers prepared in each step are shown in Table 2. DSC curves thereof are shown in FIG. 4.

Embodiment 6

(MeMBL-Co-St)$_{n3}$-b-n$BA_{n4}$-b-(MeMBL-Co-St)$_{n5}$ Three-Block with Designed Molecular Weight of 30K-25K-30K, Wherein the Ratio of the Numbers of MeMBL Unit to St Unit is 1:1

First step: dissolving 2 parts by weight of amphiphilic macromolecule reversible addition fragmentation chain transfer agent (1) into 65 parts by weight of water under stirring, to form a homogeneous aqueous phase, and then pouring the aqueous phase together with a oil phase composed of 8.4 parts by weight of St and 9 parts by weight of MeMBL into a reactor and mixing them under stirring, raising the reactor temperature to 70° C., and then introducing nitrogen thereinto for 40 minutes while keeping stirring, and then adding 0.03 parts by weight of potassium persulfate thereinto to initiate polymerization, adding an aqueous solution containing 0.26 parts by weight of sodium hydroxide when the polymerization is conducted for 15 minutes, to continue reacting for 15 minutes to obtain $AA_{n1}$-b-$St_{n2}$-b-(MeMBL-co-St)$_{n3}$-R polymer.

Second step: after completion of the first step, adding 10 parts by weight of water and adding dropwise 15 parts by weight of a nBA monomer at a rate of 1.2 parts by weight/minute, to react for 65 minutes (including the time for adding nBA monomer dropwise), to obtain $AA_{n1}$-b-$St_{n2}$-b-(MeMBL-co-St)$_{n3}$-b-n$BA_{n4}$-R block copolymer.

Third step: after completion of the second step, adding dropwise a monomer mixture of 8.7 parts by weight of St and 9.5 parts by weight of MeMBL at a rate of 0.3 parts by weight/minute to react for 97 minutes (including the time for adding the monomer mixture dropwise), to obtain $AA_{n1}$-b-$St_{n2}$-b-(MeMBL-co-St)$_{n3}$-b-n$BA_{n4}$-b-(MeMBL-co-St)$_{n5}$-R block copolymer latex.

In FIG. 4, there is a clear glass transition endothermic peak in the vicinity of −55° C. and 155° C. separately in DSC curve of 30K-25K-30K ([MeMBL]:[St]=1:1), which shows a high glass transition temperature of the hard block.

Embodiment 7

(MeMBL-Co-St)$_{n3}$-b-n$BA_{n4}$-b-(MeMBL-Co-St)$_{n5}$ Three-Block with Designed Molecular Weight of 30K-70K-30K, Wherein the Ratio of the Numbers of MeMBL Unit to St Unit is 1:4

First step: dissolving 1.3 parts by weight of amphiphilic macromolecule reversible addition fragmentation chain transfer agent (1) into 60 parts by weight of water under stirring, to form a homogeneous aqueous phase, and then pouring the aqueous phase together with a oil phase composed of 9 parts by weight of St and 2.4 parts by weight of MeMBL into a reactor and mixing them under stirring, raising the reactor temperature to 70° C., and then introducing nitrogen thereinto for 30 minutes while keeping stirring, and then adding 0.02 parts by weight of potassium persulfate thereinto to initiate polymerization, adding an aqueous solution containing 0.16 parts by weight of sodium hydroxide when the polymerization is conducted for 25 minutes, to continue reacting for 40 minutes to obtain $AA_{n1}$-b-$St_{n2}$-b-(MeMBL-co-St)$_{n3}$-R polymer.

Second step: after completion of the first step, adding 28 parts by weight of water and adding dropwise 28 parts by weight of a nBA monomer at a rate of 0.6 parts by weight/minute, to react for 97 minutes (including the time for adding nBA monomer dropwise), to obtain $AA_{n1}$-b-$St_{n2}$-b-(MeMBL-co-St)$_{n3}$-b-n$BA_{n4}$-R block copolymer.

Third step: after completion of the second step, supplying 8 parts by weight of water, and adding dropwise a monomer mixture of 9.7 parts by weight of St and 2.6 parts by weight of MeMBL at a rate of 0.56 parts by weight/minute to react for 111 minutes (including the time for adding the monomer mixture dropwise), to obtain $AA_{n1}$-b-$St_{n2}$-b-(MeMBL-co-St)$_{n3}$-b-n$BA_{n4}$-b-(MeMBL-co-St)$_{n5}$-R block copolymer latex.

In FIG. 4, there is a clear glass transition endothermic peak in the vicinity of −55° C. and 115° C. separately in DSC curve of 30K-70K-30K ([MeMBL]:[St]=1:4), which shows a high glass transition temperature of the hard block.

Embodiment 8

(MeMBL-Co-St)$_{n3}$-b-n$BA_{n4}$-b-(MeMBL-Co-St)$_{n5}$ Three-Block with Designed Molecular Weight of 45K-70K-45K, Wherein the Ratio of the Numbers of MeMBL Unit to St Unit is 1:1

First step: dissolving 0.7 parts by weight of amphiphilic macromolecule reversible addition fragmentation chain transfer agent (1) into 55 parts by weight of water under stirring, to form a homogeneous aqueous phase, and then pouring the aqueous phase together with a oil phase composed of 4 parts by weight of St and 4.5 parts by weight of MeMBL into a reactor and mixing them under stirring, raising the reactor temperature to 50° C., and then introducing nitrogen thereinto for 60 minutes while keeping stirring, and then adding 0.01 parts by weight of potassium persulfate thereinto to initiate polymerization, adding an aqueous solution containing 0.07 parts by weight of sodium hydroxide when the polymerization is conducted for 10 minutes, to continue reacting for 20 minutes to obtain $AA_{n1}$-b-$St_{n2}$-b-(MeMBL-co-St)$_{n3}$-R polymer.

Second step: after completion of the first step, adding 15 parts by weight of water and adding dropwise 14 parts by weight of a nBA monomer at a rate of 0.4 parts by weight/minute, to react for 74 minutes (including the time for adding nBA monomer dropwise), to obtain $AA_{n1}$-b-$St_{n2}$-b-(MeMBL-co-St)$_{n3}$-b-n$BA_{n4}$-R block copolymer.

Third step: after completion of the second step, supplying 10 parts by weight of water, and adding dropwise a monomer mixture of 4 parts by weight of St and 4.5 parts by weight of MeMBL at a rate of 0.2 parts by weight/minute to react for 116 minutes (including the time for adding the monomer mixture dropwise), to obtain $AA_{n1}$-b-$St_{n2}$-b-(MeMBL-co-St)$_{n3}$-b-nBA$_{n4}$-b-(MeMBL-co-St)$_{n5}$-R block copolymer latex.

Embodiment 9

(MeMBL-Co-St)$_{n3}$-b-nBA$_{n4}$-b-(MeMBL-Co-St)$_{n5}$ Three-Block with Designed Molecular Weight of 30K-200K-30K, Wherein the Ratio of the Numbers of MeMBL Unit to St Unit is 1:4

First step: dissolving 6 parts by weight of amphiphilic macromolecule reversible addition fragmentation chain transfer agent (2) into 30 parts by weight of water under stirring, to form a homogeneous aqueous phase, and then pouring the aqueous phase together with a oil phase composed of 4 parts by weight of St and 1.1 parts by weight of MeMBL into a reactor and mixing them under stirring, raising the reactor temperature to 80° C., and then introducing nitrogen thereinto for 30 minutes while keeping stirring, and then adding 0.01 parts by weight of potassium persulfate thereinto to initiate polymerization, adding an aqueous solution containing 0.07 parts by weight of sodium hydroxide when the polymerization is conducted for 20 minutes, to continue reacting for 40 minutes to obtain $AA_{n1}$-b-$St_{n2}$-b-(MeMBL-co-St)$_{n3}$-R polymer.

Second step: after completion of the first step, adding 25 parts by weight of water and adding dropwise 36 parts by weight of a nBA monomer at a rate of 0.4 parts by weight/minute, supplying 15 parts by weight of water for dilution during the reaction, to react for 120 minutes (including the time for adding nBA monomer dropwise), to obtain $AA_{n1}$-b-$St_{n2}$-b-(MeMBL-co-St)$_{n3}$-b-nBA$_{n4}$-R block copolymer.

Third step: after completion of the second step, supplying 9 parts by weight of water, and adding dropwise a monomer mixture of 4 parts by weight of St and 1.1 parts by weight of MeMBL at a rate of 0.1 parts by weight/minute to react for 110 minutes (including the time for adding the monomer mixture dropwise), to obtain $AA_{n1}$-b-$St_{n2}$-b-(MeMBL-co-St)$_{n3}$-b-nBA$_{n4}$-b-(MeMBL-co-St)$_{n5}$-R block copolymer latex.

TABLE 1

Conversion and development of latex particles in each step during preparation of the block copolymer latex

| Embodiment | | Reaction time/min | Conversion | Particle diameter/nm | Number of particles (LogNp)/$g_{Latex}^{-1}$ | particle size distribution |
| --- | --- | --- | --- | --- | --- | --- |
| 1 | First step | 40 | 91% | 71.3 | 14.82 | 1.13 |
|   | Second step | 66 | 100% | 84.5 | 14.81 | 1.10 |
|   | Third step | 116 | 94% | 95.9 | 14.80 | 1.03 |
| 2 | First step | 40 | 92% | 68.8 | 14.85 | 1.16 |
|   | Second step | 73 | 96% | 91.9 | 14.83 | 1.13 |
|   | Third step | 93 | 87% | 100.4 | 14.75 | 1.08 |
| 3 | First step | 40 | 94% | 75.1 | 14.74 | 1.07 |
|   | Second step | 94 | 100% | 100.9 | 14.72 | 1.11 |
|   | Third step | 138 | 96% | 107.8 | 14.67 | 1.14 |
| 4 | First step | 40 | 94% | 61.5 | 14.96 | 1.03 |
|   | Second step | 75 | 97% | 91.4 | 14.83 | 1.01 |
|   | Third step | 95 | 100% | 94.1 | 14.82 | 1.03 |
| 5 | First step | 40 | 95% | 61 | 14.99 | 1.03 |
|   | Second step | 64 | 100% | 82.7 | 14.94 | 1.02 |
|   | Third step | 97 | 95% | 89.5 | 14.89 | 1.01 |

TABLE 2

Development of molecular weight in each step during the preparation of the block copolymer latex

| Embodiment | | Designed molecular weight/(g · mol$^{-1}$) | Measured molecular weight/(g · mol$^{-1}$) | Molecular weight distribution |
| --- | --- | --- | --- | --- |
| 1 | First step | 29 500 | 28 300 | 1.76 |
|   | Second step | 55 100 | 55 800 | 1.81 |
|   | Third step | 84 600 | 78 600 | 2.40 |
| 2 | First step | 29 600 | 29 400 | 1.74 |
|   | Second step | 97 000 | 104 500 | 2.46 |
|   | Third step | 122 400 | 133 000 | 2.50 |
| 3 | First step | 30 500 | 28 800 | 1.78 |
|   | Second step | 121 900 | 146 900 | 3.75 |
|   | Third step | 149 500 | 155 200 | 3.33 |
| 4 | First step | 17 100 | 18 100 | 1.53 |
|   | Second step | 85 000 | 100 700 | 2.05 |
|   | Third step | 100 100 | 107 000 | 1.98 |
| 5 | First step | 17 100 | 17 400 | 1.51 |
|   | Second step | 52 200 | 58 000 | 1.76 |
|   | Third step | 66 500 | 82 200 | 1.85 |

The above embodiments are intended to explain the present invention, rather than limit the present invention. Any modifications and variations may be made within the spirit of the present invention and the scope claimed in the appended claims, and fall within the scope of the present invention.

What is claimed is:

1. A block copolymer comprising a block with glass transition temperature higher than 100° C., wherein the block copolymer is represented by the following structural formula: $AA_{n1}$-b-$St_{n2}$-b-(MeMBL-co-St)$_{n3}$-b-nBA$_{n4}$-b-(MeMBL-co-St)$_{n5}$-R; wherein, in $AA_{n1}$, AA is methacrylic acid monomer unit or acrylic acid monomer unit, n1 is an average degree of polymerization of AA, n1=20-60; in $St_{n2}$, St is styrene monomer unit, n2 is an average degree of polymerization of St, n2=3-10; in (MeMBL-co-St)$_{n3}$, MeMBL-co-St is random copolymer of MeMBL and St, MeMBL is γ-methyl-α-methylene-γ-butyrolactone monomer unit, St is styrene monomer unit, the ratio of the numbers of MeMBL unit to St unit is 1:4 to 1:1, n3 is an average degree of polymerization of MeMBL-co-St copolymer, n3=130-500; in nBA$_{n4}$, nBA is n-butyl acrylate monomer unit, n4 is an average degree of polymerization of nBA, n4=200-1600; in (MeMBL-co-St)$_{n5}$, MeMBL-co-St is random copolymer of MeMBL and St, MeMBL is γ-methyl-α-methylene-γ-butyrolactone monomer unit, St is styrene monomer unit, the ratio of the numbers of MeMBL unit to St unit is 1:4 to 1:1, n5 is an average degree of polymerization of MeMBL-co-St copolymer, n5=130-500; R is an alkyl dithio ester group or an alkyl trithio ester group, and the block copolymer is stably dispersed in water in the form of particles and has a volume average particle diameter of 80-140 nm.

2. A method for preparing latex of a block copolymer by a reversible addition fragmentation chain transfer emulsion polymerization, the block copolymer is the block copolymer comprising a block with glass transition temperature higher than 100° C. according to claim 1, the method comprising the following steps:

(1): dissolving 0.6-2.4 parts by weight of an amphiphilic macromolecule reversible addition fragmentation chain transfer agent into 30-90 parts by weight of water under stirring, to form a homogeneous aqueous phase, and then pouring the aqueous phase together with a oil phase composed of 3.4-11 parts by weight of St and 1.8-9 parts by weight of MeMBL into a reactor and mixing them under stirring; raising the reactor temperature to 50-80° C., and then introducing nitrogen thereinto for 30-60 minutes while keeping stirring, and then adding 0.01-0.04 parts by weight of a water-soluble initiator thereinto to initiate polymerization, adding an aqueous solution containing 0.07-0.27 parts by weight of an alkali when the polymerization is conducted for 10-25 minutes, to continue reacting for 15-40 minutes to obtain AA$_{n1}$-b-St$_{n2}$-b-(MeMBL-co-St)$_{n3}$-R polymer;

(2): after completion of the first step, adding 7-25 parts by weight of water and adding dropwise 14-36 parts by weight of a nBA monomer at a rate of 0.4 to 1.4 parts by weight/minute to continue reacting and supplying 0-30 parts by weight of water for dilution during the reaction, to obtain AA$_{n1}$-b-St$_{n2}$-b-(MeMBL-co-St)$_{n3}$-b-nBA$_{n4}$-R block copolymer, wherein the time for adding dropwise and reacting is 60-120 minutes in total; and (3): after completion of the second step, supplementing 0-10 parts by weight of water, and adding dropwise a monomer mixture of 3.4-12 parts by weight of St and 1.9-9.5 parts by weight of MeMBL at a rate of 0.1 to 0.6 parts by weight/minute to continue reacting and obtain AA$_{n1}$-b-St$_{n2}$-b-(MeMBL-co-St)$_{n3}$-b-nBA$_{n4}$-b-(MeMBL-co-St)$_{n5}$-R block copolymer latex, wherein the time for adding dropwise and reacting is 90-140 minutes in total.

3. The method for preparing latex of a block copolymer by a reversible addition fragmentation chain transfer emulsion polymerization according to claim 2, wherein the amphiphilic macromolecule reversible addition fragmentation chain transfer agent has a chemical structure represented by the following general formula:

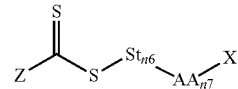

wherein, St is styrene monomer unit, AA is methacrylic acid monomer unit or acrylic acid monomer unit, Z is alkylthio or alkyl having four to twelve carbon atoms, phenyl or benzyl, X is iso-propionyloxy, acetoxy, 2-cyanoacetoxy or 2-aminoacetoxy; n$_6$ is an average degree of polymerization of styrene monomer unit, n$_6$=3-10, n$_7$ is an average degree of polymerization of a methacrylic acid monomer unit or an acrylic acid monomer unit, and n$_7$=20-60.

4. The method for preparing latex of a block copolymer by a reversible addition fragmentation chain transfer emulsion polymerization according to claim 3, wherein the amphiphilic macromolecule reversible addition fragmentation chain transfer agent is an amphiphilic oligomer with molecular weight between 1,000 to 6,000.

5. The method for preparing latex of a block copolymer by a reversible addition fragmentation chain transfer emulsion polymerization according to claim 2, wherein the water-soluble initiator is potassium persulfate, ammonium persulfate, hydrogen peroxide or a derivative of hydrogen peroxide.

6. The method for preparing latex of a block copolymer by a reversible addition fragmentation chain transfer emulsion polymerization according to claim 2, wherein the alkali is sodium hydroxide, potassium hydroxide, sodium carbonate, potassium carbonate, sodium bicarbonate or potassium bicarbonate.

* * * * *